Sept. 17, 1929.    A. N. PASMAN    1,728,769
PIPE FITTING
Filed June 8, 1927    2 Sheets-Sheet 1
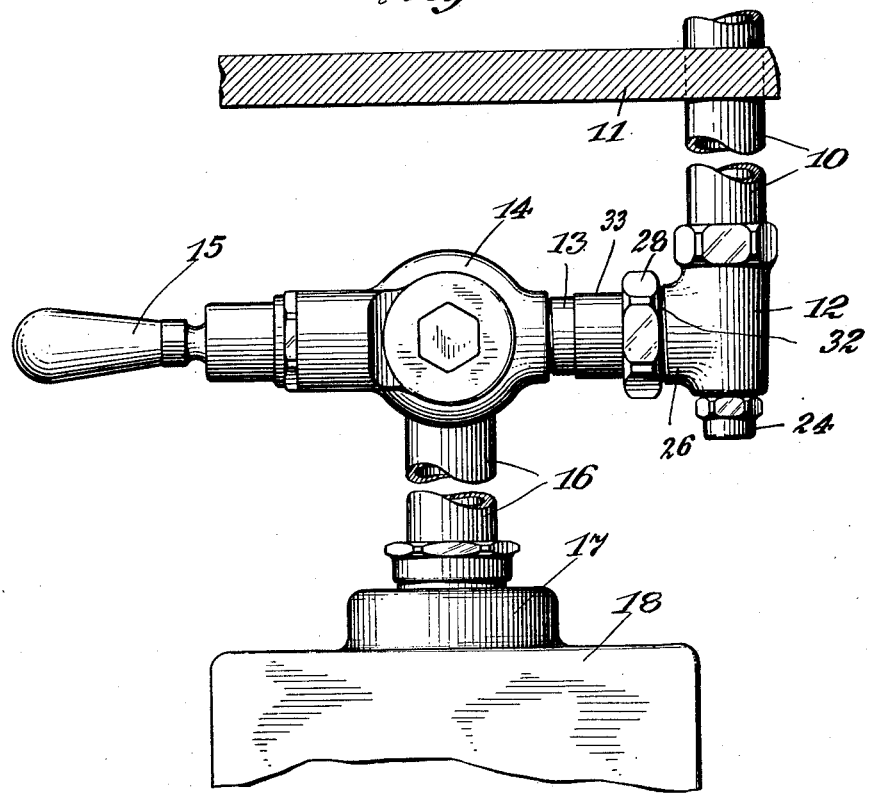
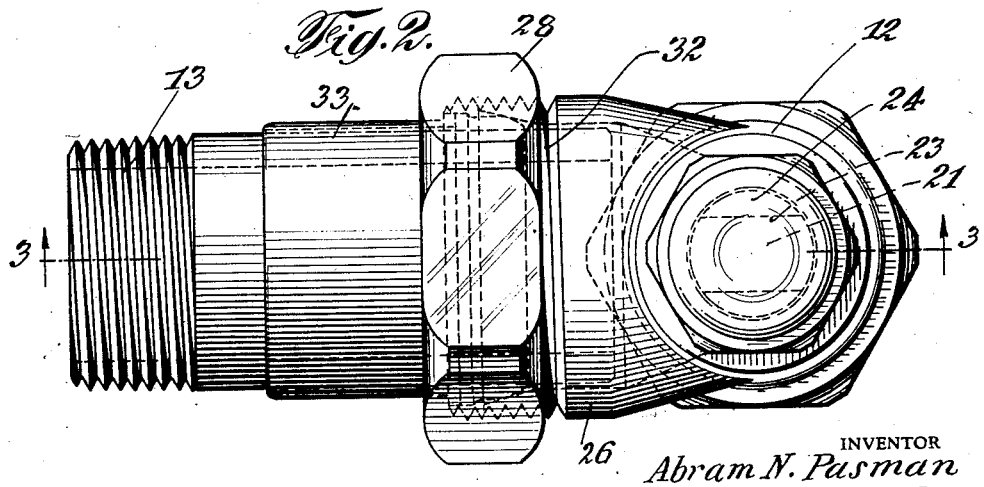
INVENTOR
Abram N. Pasman
BY
ATTORNEYS Sept. 17, 1929.　　　A. N. PASMAN　　　1,728,769
PIPE FITTING
Filed June 8, 1927　　　2 Sheets-Sheet 2
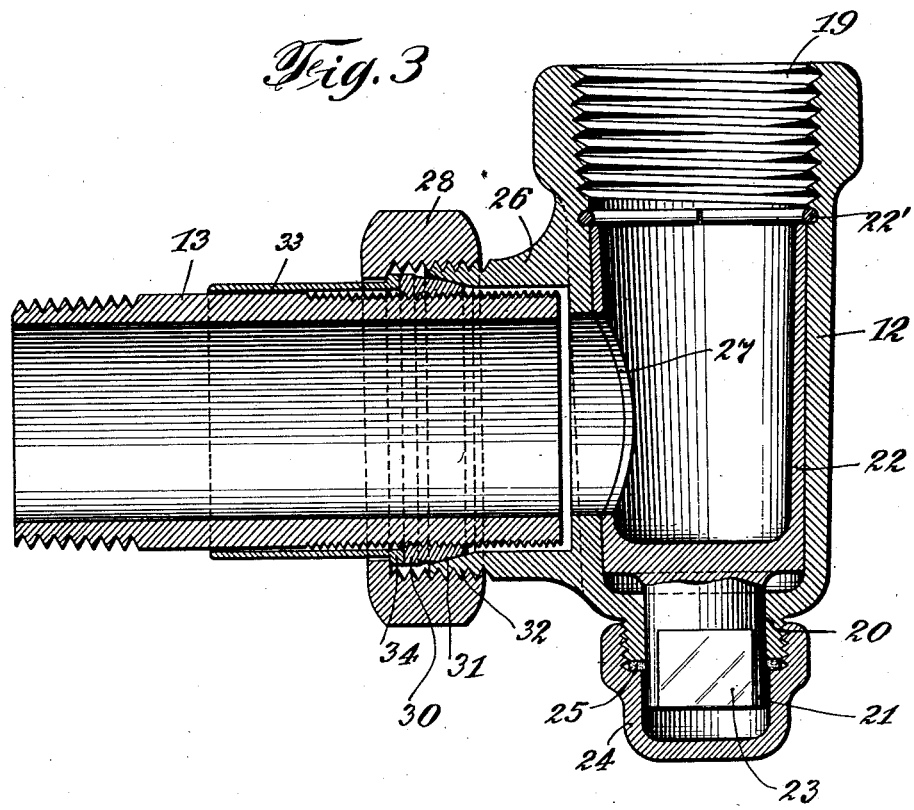
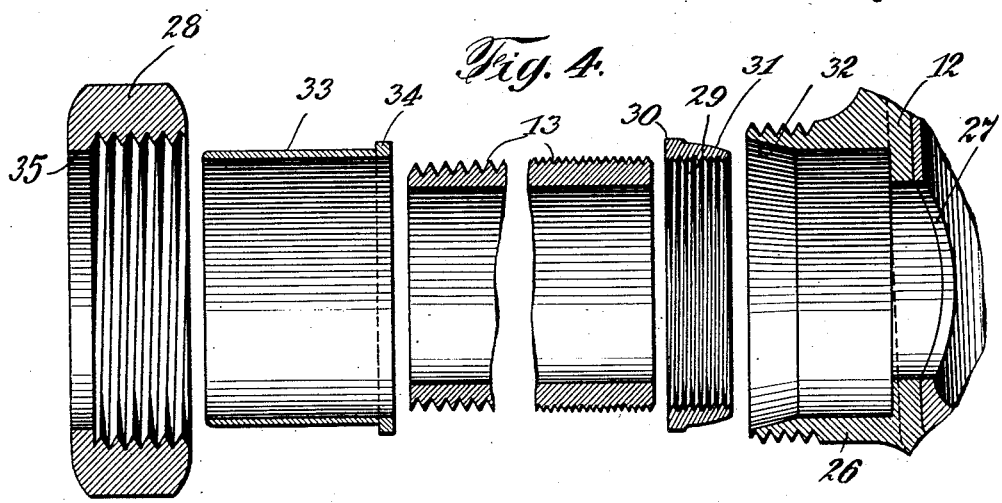
INVENTOR
Abram N. Pasman Patented Sept. 17, 1929

1,728,769

UNITED STATES PATENT OFFICE

ABRAM N. PASMAN, OF WATERBURY, CONNECTICUT, ASSIGNOR TO SCOVILL MANUFACTURING COMPANY, OF WATERBURY, CONNECTICUT, A CORPORATION OF CONNECTICUT

PIPE FITTING

Application filed June 8, 1927. Serial No. 197,263.

This invention relates to an improvement in pipe fittings and more particularly to an adjustable union by means of which different types of fittings may be connected. The invention as illustrated and described herein is applicable to connecting a supply pipe with a flush valve for a toilet, urinal, or other similar fixture. It will be understood, however, that this is merely illustrative as the adjustable union may be employed in connecting any pipe fittings where its use appears advisable or necessary. As will be understood, for example in setting closets, urinals and like fixtures relatively to the source of water supply or the supply pipe for furnishing water thereto, the fixture and the supply pipe must bear in absolutely fixed relationship to each other and to a standard connection or union in order to readily connect the parts. The position of the fixture relatively to the supply pipe is often otherwise than intended, and in such instances it is necessary to make a special connection or to shift the position of the water pipe or the fixture in order to use a standard fitting. The object of the invention is to overcome this difficulty, and in so doing the union employed and comprising the invention is adjustable to position longitudinally between the parts that it is adapted to connect, whereby any difference from the designed standard, that is from a fixed difference, may be readily taken up and the parts connected without difficulty.

In carrying out the invention the union made in accordance therewith comprises a body member which may be constructed to operate as a regulating and shut off valve, a pipe member shiftable to position relatively to the body member, and means for connecting the pipe to the body member within the range of the adjustability of the parts, as will be hereinafter more particularly described.

In the drawing Figure 1 is a plan of an adjustable union made in accordance with my invention and illustrating the same as connecting a supply pipe with a flush valve.

Fig. 2 is an inverted plan on an enlarged scale of the adjustable union.

Fig. 3 is a longitudinal section on line 3—3, Fig. 2, and

Fig. 4 is a section showing the parts in position to be assembled for use.

By reference to Figure 1 it will be seen that the adjustable union made in accordance with my invention may be employed for example to connect a supply pipe with a flush valve. In this figure of the drawing, a supply pipe is indicated at 10 and is illustrated as passing through a wall 11. The body of the union is indicated at 12 and the adjustable pipe member thereof at 13. As illustrated in this figure, the body of the union is connected to the supply pipe and the adjustable pipe member 13 to the inlet of a flush valve 14. The flush valve may be operated by a handle 15 or otherwise, and the outlet thereof is connected by a pipe 16 to the inlet connection 17 at the rear or back of a toilet bowl or urinal 18.

As illustrated, the adjustable union is constructed to include the body member 12 of a plug valve so as to be utilized for turning on or shutting off the water supply and also for regulating the same. One end of this body member 12 is tapped as indicated at 19 to receive the threaded end of a pipe, as for example as the supply pipe 10. The body member 12 is preferably tapered to a slight extent and at its opposite end is provided with a bore 20 adapted to receive the stem 21 of a plug valve 22. The stem 21 may be flattened as indicated at 23 so as to make it readily possible by a suitable wrench or other tool to turn the plug valve to any desired position. This end of the body member may be fitted with a cap 24 adapted to be turned down against a gasket 25 in order to make a water tight joint as will be readily understood. Also as illustrated, the interior of the body member may be provided with a peripheral groove for the reception of a split ring 22' for maintaining the plug valve in the necessary position therein. The body member 12 as illustrated, is provided with a branch or extension 26 which as illustrated is a lateral extension and the passage therethrough leads to the interior of the body member. In a suitable position the plug valve 22 is provided with an aperture or port 27 preferably of the same diameter as the passage in the extension 26 leading to the interior of the body member so that depending upon the position of the plug valve the port 27 may be closed or opened to any desired extent to either shut off or turn on or regulate the supply of water to the plug valve and the passage of the water therefrom.

The outer portion of the extension 26 is exteriorly screw threaded and thereby adapted to receive a nut 28 which may be turned down thereon. The adjustable union also includes a pipe member or section 13, one end of which is adapted to enter the bore or passage in the extension 26 to any desired or necessary extent, and the opposite end of this pipe member is exteriorly screw threaded and is adapted to be connected to a flush valve, for example as shown at 14 in Fig. 1, or to any other fitting. The end of the pipe member which enters the extension 26 is also screw threaded and is adapted to receive a collar 29. This collar is tapped so as to be turned to any desired position on this screw threaded end of the pipe member. The outer surface of the collar is preferably flanged at one end thereof as indicated at 30, while at the opposite end the peripheral surface of the collar is preferably tapered as indicated at 31. For an appreciable distance from the extremity of the extension 26 the inner surface thereof is also tapered as indicated at 32 so as to be adapted to receive the tapered surface of the collar 29.

The adjustable union also includes a sleeve 33 adapted to fit over the pipe member 13 and at one end thereof is provided with a flange 34, the outer diameter of the flange 34 being substantially the same as the outer diameter of the flange 30 on the collar 29. Furthermore, at one end of the nut 28 there is an internal flange 35 which is of substantially the same diameter as the outer diameter of the body of the sleeve 33 and of smaller diameter than the flanges 30 and 34.

Now as will be understood in the use of the union as hereinbefore described, the body thereof is connected to the screw threaded end of the supply pipe while the outer end of the pipe member 13 is connected to the inlet of the flush valve or other fitting after the same has been fixed in place. In so doing with the other parts of the union in position, the extent to which the opposite end of the pipe member 13 will enter the extension of the body member depends upon the distance between the center lines of the pipes 10 and 16, and as will be apparent if these pipes are not a predetermined distance apart there will be no difficulty in making the connection or necessity of making a special fitting to unite these parts. With the parts in place as described, the collar 29 is turned to position so as to enter and make a relatively tight joint between the outer surface thereof and the internally tapered surface of the extension of the body member, whereupon the sleeve is shifted to cause the flanged end thereof to contact with the flanged end of the collar and then the nut 28 is turned to position with the flange 35 thereof engaging the flange 34 of the sleeve. These parts being of substantially the same diameter provide a uniform bearing and one which cannot be disrupted to mar the connection and at the same time making it possible to turn the nut sufficiently far to force the collar into the extension to the necessary extent to form a water tight joint. It will furthermore be understood that in view of the sleeve 33 which may be longer or shorter than that illustrated, it will in any event be sufficient to cover the screw threaded end of the pipe member on which the collar is mounted so that the screw threads cannot be seen and will thus make a finished joint which is in no way unsightly in appearance.

As hereinbefore stated, the adjustable union as herein shown and described is more or less illustrative, as the particular connection between the body member and the pipe member may be otherwise than as shown, and the plug valve for example may be entirely omitted without departing from the nature of the invention.

I claim as my invention:

1. In pipe fittings, an adjustable union comprising a pipe member having an exteriorly screw threaded end adapted to enter a passage in a body to which the pipe is to be connected, a collar tapped to be turned to any desired position on the screw theaded end of the pipe member, a sleeve slidable loosely on the said pipe member and having a shoulder at one end thereof at which the sleeve is adapted to engage the adjacent end of the said collar, and a nut through which a portion of the said sleeve extends and which is provided with an internal projection, the said nut being adapted to be turned down on the said member to which the pipe is to be connected and in so doing to cause the said projection thereon to engage the said shoulder on the said sleeve to force the sleeve into engagement with the collar and the collar into engagement with the member to which the pipe is to be connected to make a tight joint between the same, the portion of the sleeve projecting beyond the nut being adapted to cover and conceal the screw threads on the pipe.

2. In pipe fittings, an adjustable union including a pipe member having an exteriorly screw threaded end adapted to freely enter a portion of a body to which the pipe is to be connected, a collar tapped to be turned to any desired position on the screw threaded end of the pipe member and having a flange thereon, a sleeve slidable loosely on the said screw threaded end of the pipe member and having a flange thereon of substantially the same diameter as the flange on the collar, the said flanges being adapted to abut one another, and a nut adapted to be turned down on the body to which the pipe is to be connected and to engage the flange on the sleeve to force the collar to place within the body to which the pipe is to be connected, the said sleeve extending through and beyond the said nut and being of sufficient length to cover the screw threads of the pipe member, whereby the pipe member may be attached to the said body to which it is to be connected in any one of a number of positions and the screw threads on the pipe member covered and concealed by the sleeve.

Signed by me this 1st day of June, 1927.

ABRAM N. PASMAN.